(12) United States Patent
Kim

(10) Patent No.: US 11,223,079 B2
(45) Date of Patent: Jan. 11, 2022

(54) BATTERY PACK

(71) Applicant: SAMSUNG SDI CO., LTD., Yongin-si (KR)

(72) Inventor: Dukjung Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 2 days.

(21) Appl. No.: 16/488,993

(22) PCT Filed: Feb. 7, 2018

(86) PCT No.: PCT/KR2018/001644
§ 371 (c)(1),
(2) Date: Aug. 27, 2019

(87) PCT Pub. No.: WO2018/174406
PCT Pub. Date: Sep. 27, 2018

(65) Prior Publication Data
US 2020/0020995 A1    Jan. 16, 2020

(30) Foreign Application Priority Data
Mar. 21, 2017 (KR) .................. 10-2017-0035614

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/486* (2013.01); *H01M 10/613* (2015.04); *H01M 2010/4271* (2013.01)

(58) Field of Classification Search
CPC ............. H01M 10/653; H01M 10/613; H01M 10/486; H01M 2010/4271
See application file for complete search history.

(56) References Cited

U.S. PATENT DOCUMENTS

2010/0116468 A1* 5/2010 Kimura ............. H01M 10/6568
165/104.33
2011/0027625 A1 2/2011 Payne
(Continued)

FOREIGN PATENT DOCUMENTS

JP       11-307139 A     11/1999
KR  10-2009-0117769 A    11/2009
(Continued)

OTHER PUBLICATIONS

International Search Report for PCT/KR2018/001644 filed on Feb. 7, 2018.

*Primary Examiner* — Osei K Amponsah
(74) *Attorney, Agent, or Firm* — Lee IP Law, P.C.

(57) ABSTRACT

The present invention relates to a battery pack. The present invention includes: a plurality of battery cells disposed in one direction; a heat transfer oil configured to contact surfaces of the battery cells; a frame configured to accommodate the battery cells and the heat transfer oil; a cooling plate configured to contact bottom surfaces of the battery cells through the frame and having cooling water flowing therein; and a battery management unit configured to manage heat generated from the battery cells by using at least one of a cell temperature of the battery cells, a temperature of the heat transfer oil, and a temperature of the cooling water.

8 Claims, 2 Drawing Sheets

(51) Int. Cl.
*H01M 10/48* (2006.01)
*H01M 10/42* (2006.01)

(56) References Cited

U.S. PATENT DOCUMENTS

| | | | |
|---|---|---|---|
| 2011/0300428 A1* | 12/2011 | Sohn | H01M 10/647 |
| | | | 429/120 |
| 2012/0040227 A1 | 2/2012 | Jeong et al. | |
| 2013/0249496 A1* | 9/2013 | Ju | F02N 11/101 |
| | | | 320/136 |
| 2016/0268657 A1 | 9/2016 | Park et al. | |

FOREIGN PATENT DOCUMENTS

| KR | 10-2011-0132793 A | 12/2011 |
|---|---|---|
| KR | 10-2012-0015947 A | 2/2012 |
| KR | 10-1161141 B1 | 6/2012 |
| KR | 10-2013-0009268 A | 1/2013 |
| KR | 10-2016-0109679 A | 9/2016 |

\* cited by examiner

BATTERY PACK

CROSS-REFERENCE TO THE RELATED APPLICATION

This is the U.S. national phase application based on PCT Application No. PCT/KR2018/001644, filed Feb. 7, 2018, which is based on Korean Patent Application No. 10-2017-0035614, filed Mar. 21, 2017, the entire contents of all of which are hereby incorporated by reference.

TECHNICAL FIELD

The present invention relates to a battery pack.

BACKGROUND ART

A rechargeable battery may be repeatedly charged and discharged, and as such, a nickel-hydrogen (Ni-MH) battery, a lithium (Li) ion battery, or the like may be employed. The rechargeable battery may be formed to include one battery cell so as to be used for a portable small electronic device such as a mobile phone, a notebook computer, a computer, a camera, or a camcorder, or may be formed to include a battery pack including a plurality of battery cells so as to be used as a motor driving power source for a high output hybrid electric vehicle (HEV), an electric vehicle (EV), or the like.

The battery pack may generate a lot of heat by a charging or discharging operation, thereby deteriorating the battery cells. Accordingly, a battery pack capable of efficiently managing heat generated from battery cells is required.

DISCLOSURE

An exemplary embodiment of the present invention has been made in an effort to provide a battery pack capable of efficiently managing heat generated from a battery cell.

An exemplary embodiment of the present invention provides a battery pack including: a plurality of battery cells disposed in one direction; a heat transfer oil configured to contact surfaces of the battery cells; a frame configured to accommodate the battery cells and the heat transfer oil; a cooling plate configured to contact bottom surfaces of the battery cells through the frame and having cooling water flowing therein; and a battery management unit configured to manage heat generated from the battery cells by using at least one of a cell temperature of the battery cells, a temperature of the heat transfer oil, and a temperature of the cooling water.

Herein, the battery management unit may determine whether the battery cells are in a normal state or an over-temperature state depending on the cell temperature and the temperature of the heat transfer oil, and controls supply of the cooling water when it is determined that the battery cells are in the over-temperature state. The battery management unit may determine the battery cells are in the over-temperature state when each of the cell temperature and the temperature of the heat transfer oil corresponds to the over-temperature state.

The battery management unit may determine a state of the battery cells based on the temperature of the heat transfer oil when the state of the battery cells determined depending on the cell temperature is different from that depending on the temperature of the heat transfer oil. The battery pack may further include first to third temperature sensors configured to respectively measure the cell temperature, the temperature of the heat transfer oil, and the temperature of the cooling water.

Herein, the battery management unit may determine that a temperature sensor that measures a temperature corresponding to a different state for the state of the battery cells, determined depending on the cell temperature, the temperature of the heat transfer oil, and the temperature of the cooling water, is defective among the first to third temperature sensors when the battery cells are determined to be in the normal state based on the temperature of the heat transfer oil. The battery pack may further include a level sensor configured to measure a level of the heat transfer oil.

The battery management unit may determine a leakage of the battery cells or the heat transfer oil depending on a change in the level of the heat transfer oil. The battery management unit may determine that the battery cells have leaked when the level of the heat transfer oil becomes lower than that of a previous unit time, and determines that the heat transfer oil has leaked when the level of the heat transfer oil is continuously lowered. The heat transfer oil may contain electrically insulating mineral oil.

According to the exemplary embodiment of the present invention, it is possible to improve cooling efficiency of the battery cells and secure the insulation of the battery cells to prevent an unnecessary short circuit between the battery cells and an external electronic device, by using a liquid type of insulating oil as a heat transfer medium between the battery cells.

In addition, it is possible to accurately detect an abnormal state by determining the temperature of the battery cells and the defectiveness of the temperature sensors for measuring them by combining the cell temperature, the temperature of the insulating oil, and the temperature of the cooling water.

MODE FOR INVENTION

Figure 1:
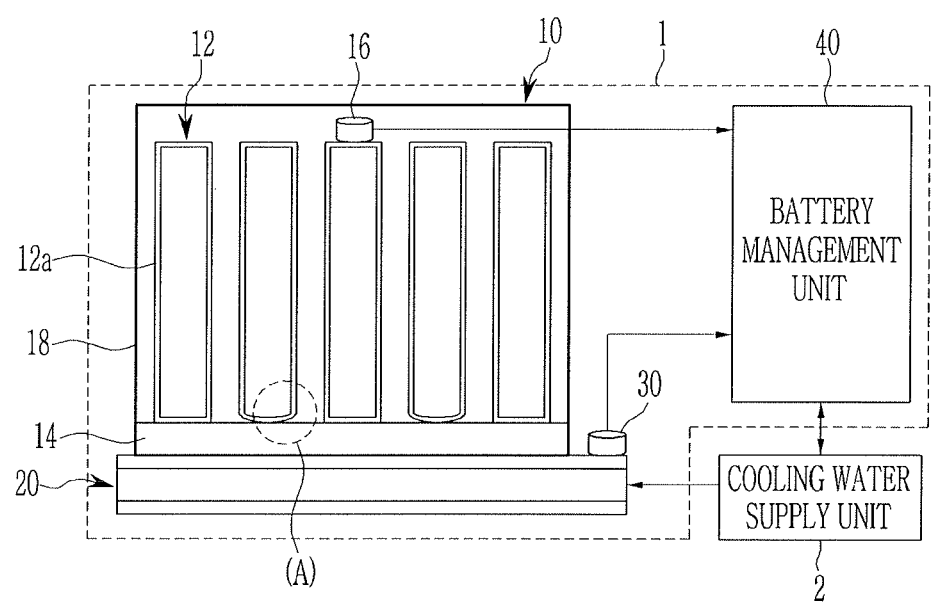
FIG. 1 illustrates a general battery pack.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled/connected" to another element, the element may be "directly coupled/connected" to the other element or "indirectly coupled/connected" to the other element through a third element. In addition, unless explicitly described to the contrary, the word "comprise" and variations such as "comprises" or "comprising" will be understood to imply the inclusion of stated elements but not the exclusion of any other elements.

Hereinafter, an exemplary embodiment of the present invention will be described in detail with reference to the accompanying drawings.

FIG. 1 illustrates a general battery pack.

Referring to FIG. 1, a battery pack 1 includes a battery module 10, a cooling plate 20, a cooling water temperature sensor 30, and a battery management unit 40. The battery module 10 includes a plurality of battery cells 12 disposed in one direction, a heat transfer member 14, a cell temperature sensor 16, and a frame 18.

Each of the battery cells 12 may include an electrode assembly (not illustrated) in which a positive electrode plate and a negative electrode plate are disposed with a separator therebetween, an electrolyte solution (not illustrated), and a case 12a in which the electrode assembly and the electrolyte solution are embedded.

The heat transfer member 14 is disposed between bottom surfaces of the battery cells 12 and the frame 18, to transfer heat generated from the battery cells 12 to the frame 18. The heat transfer member 14 may be formed as a sheet having a predetermined thickness and containing a polymer material.

The cell temperature sensor 16 is disposed on the case 12a of one of the battery cells 12, to measure a temperature of the battery cells 12 and transmit the measured temperature to the battery management unit 40.

The frame 18 may accommodate the battery cells 12, a heat transfer member 14, and a cell temperature sensor 16, and may be formed of a metal material to discharge heat generated from the battery cells 12 to the outside.

The cooling plate 20 is coupled to and contacts the lower portion of the frame 18. The cooling plate 20 may be formed of a metal material including a heat exchange medium therein, e.g., as a passage through which cooling water flows, to cool the heat generated from the battery cells 12 by the cooling water. The cooling plate 20 may be connected to an external cooling water supply unit 2, e.g., an air conditioning module of a vehicle, to receive cooling water.

The cooling water temperature sensor 30 is disposed on the cooling plate 20, to measure the temperature of the cooling water and transfer the measured temperature to the battery management unit 40. The cooling water temperature sensor 30 may estimate the temperature of the cooling water by measuring the temperature of the cooling plate 20. The invention is not limited thereto, and the cooling water temperature sensor 30 can directly measure the temperature of the cooling water.

The battery management unit 40 receives the cell temperature and the cooling water temperature from the cell temperature sensor 16 and the cooling water temperature sensor 30, respectively. Further, the battery management unit 40 receives a level of the cooling water from the cooling water supply unit 2. The battery management unit 40 may manage the heat generated from the battery cell 12 depending on the cell temperature and the cooling water temperature, and may determine a defect in the cooling water temperature sensor 30.

For example, as shown in Table 1 below, when the battery cell 12 is in an over-temperature state in which the cell temperature is higher than a preset reference temperature, the battery management unit 40 requests the cooling water supply unit 2 to supply a certain level of cooling water. When it is determined that the battery cells 12 are in a normal state based on the cell temperature, while the battery cells are in the over-temperature state based on the cooling water temperature, the battery management unit 40 may determine that a defect has occurred in the cooling water temperature sensor 18, and may notify a user thereof.

TABLE 1

| | Cell temperature | Cooling water temperature | Determination |
|---|---|---|---|
| 1 | Over | Over | Over |
| 2 | Over | Normal | Over |
| 3 | Normal | Over | Cooling water temperature sensor is defective |
| 4 | Normal | Normal | Normal |

Generally, the case 12a of each of the battery cells 12 is formed by deep drawing a metal plate. As a result, a rounded portion A protruded outward may be formed at a portion where a side surface and a bottom surface of the case 12a are connected with each other. The bottom surface of the case 12a is not uniformly brought into contact with the heat transfer member 14 by the rounded portion A. Particularly, when the thickness of the heat transfer member 14 is smaller than a curvature radius of the rounded portion A, a non-contact area increases.

Thus, when a solid-state heat transfer member 14 is applied, the heat of the battery cells 12 transferred to the cooling plate 20 is lost. As a result, performance of the battery cells 12 may be deteriorated because heat management through the battery management unit 40 does not proceed normally.

In this case, a temperature deviation may occur depending on a position of the cell temperature sensor 16, and reliability with respect to a representative temperature measured by the cell temperature sensor 16 may be lowered. That is, when the cell temperature sensor 16 is positioned in a first battery cell 12 without the round portion A, a temperature difference occurs between the first battery cell and a second battery cell 12 showing performance that has been deteriorated due to the round portion A. When the battery management unit 40 performs the heat management based on the cell temperature measured by the cell temperature sensor 16, a risk of ignition may be increased.

Figure 2:
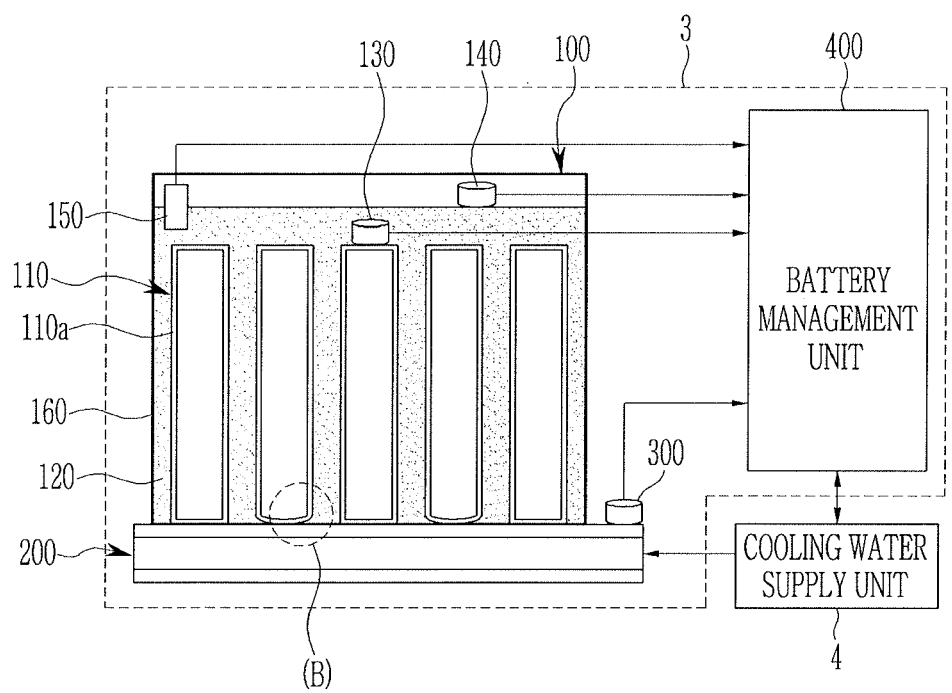
FIG. 2 illustrates a battery pack according to an exemplary embodiment of the present invention.

FIG. 2 illustrates a battery pack according to an exemplary embodiment of the present invention.

Referring to FIG. 2, according to the exemplary embodiment of the present invention, a battery pack 3 includes a battery module 100, a cooling unit 200, a cooling water temperature sensor 300, and a battery management unit 400. The battery module 100 includes a plurality of battery cells 110 disposed in one direction, heat transfer oil 120, a cell temperature sensor 130, an oil temperature sensor 140, a level sensor 150, and a frame 160.

Each of the battery cells 110 may include an electrode assembly (not illustrated) in which a positive electrode plate and a negative electrode plate are disposed with a separator therebetween, an electrolyte solution (not illustrated), and a case 110a in which the electrode assembly and the electrolyte solution are embedded. The battery cell 110 according to the exemplary embodiment of the present invention may be a lithium ion rechargeable battery, but the present invention is not limited thereto, and may be applied to various kinds of rechargeable batteries such as a lithium polymer battery.

The case 110a may have an angular shape, and may be formed by deep drawing a metal plate. A rounded portion B protruded outward may be formed at a portion where a side surface and a bottom surface of the case 110a are connected with each other in a forming method of the case 110a.

The heat transfer oil 120 is filled in the frame 160, to contact a plurality of surfaces of the battery cells 110. The heat transfer oil 120 is an electrically insulating mineral oil that transfers heat generated from the battery cells 110 to the cooling plate 200 and insulates the battery cells 110 from an external electrical device. That is, since the heat transfer oil 120 is a liquid type, it is uniformly in contact with the entire surface including the round portion B of the case 110a as compared with the solid type of heat transfer member 14, thereby preventing heat transfer loss between the battery cells 110 and the cooling plate 200.

The cell temperature sensor 130 is disposed on the case 110a of one of the battery cells 110, to measure a temperature of the battery cells 110 and transmit the measured temperature to the battery management unit 400. The oil temperature sensor 140 measures a temperature of the heat transfer oil 120 to transmit the measured temperature to the battery management unit 400. The level sensor 150 measures a level of the heat transfer oil 120 and transmits it to the battery management unit 400.

The frame 160 may accommodate the battery cells 12, the heat transfer oil 120, the cell temperature sensor 130, the oil temperature sensor 140, and the water level sensor 150, and may be formed of a metal material to discharge heat generated from the battery cells 12 to the outside.

The cooling plate 200 is coupled to and contacts the lower portion of the frame 160. The cooling plate 200 may be formed of a metal material including a heat exchange medium therein, e.g., as a passage through which cooling water flows, to cool the heat generated from the battery cells 110 by the cooling water. The cooling plate 200 may be connected to an external cooling water supply unit 4, e.g., an air conditioning module of a vehicle to receive cooling water. The cooling water temperature sensor 300 is disposed on the cooling plate 200, to measure the temperature of the cooling water and transfer the measured temperature to the battery management unit 400. The cooling water temperature sensor 300 may estimate the temperature of the cooling water by measuring the temperature of the cooling plate 200. The invention is not limited thereto, and the cooling water temperature sensor 300 can directly measure the temperature of the cooling water.

The battery management unit 400 receives the cell temperature, the oil temperature, and the cooling water temperature from the cell temperature sensor 130, the oil temperature sensor 140, and the cooling water temperature sensor 300, respectively, to determine whether the cell temperature sensor 130, the oil temperature sensor 140, and the cooling water temperature sensor 300 are in an abnormal state based on the cell temperature, the oil temperature, and the cooling water temperature.

Specifically, the battery management unit 400 determines an over-temperature state of the battery cells 110 depending on the cell temperature and the oil temperature. When the battery cell 110 is determined to be in an over-temperature state, the battery management unit 400 may request the cooling water supply unit 4 to supply a certain level of cooling water. When results of determining of the state of the battery cells 110 based on the cell temperature and the oil temperature are different, the battery management unit 400 preferentially determines the state of the battery cells 110 based on the oil temperature.

Specifically, as shown in Nos. 1 and 3 of Table 2, the battery management unit 400 may determine that the battery cells 110 is in the over-temperature state when the results of determining of the state of the battery cells 110 based on the cell temperature and the oil temperature are the same as the over-temperature state.

TABLE 2

| | Cell temperature | Cooling water temperature | Oil temperature | Determination |
|---|---|---|---|---|
| 1 | Over | Over | Over | Over |
| 2 | Over | Over | Normal | Oil temperature sensor 140 is defective |
| 3 | Over | Normal | Over | Over |
| 4 | Over | Normal | Normal | Cell temperature sensor 130 is defective |
| 5 | Normal | Over | Over | Over |
| 6 | Normal | Over | Normal | Cooling water temperature sensor 300 is defective |
| 7 | Normal | Normal | Over | Over |
| 8 | Normal | Normal | Normal | Normal |

As shown in Nos. 5 and 7 of Table 2, the management unit 400 determines that the battery cells 110 are in the over-temperature state when the result of determining the state of the battery cells 110 based on the cell temperature is the normal state and the result of determining the state of the battery cells 110 based on the oil temperature is the over-temperature state. As a result, the battery management unit 400 may accurately determine the temperature of the battery cell 110 regardless of the position of the cell temperature sensor 130 by using the cell temperature as well as the oil temperature for the determination of the state.

When the result of determining the state of the battery cells 110 based on the oil temperature corresponds to the normal state, the battery management unit 400 determines that a temperature sensor, which measures a temperature corresponds to the different state from at least a remaining state of the cell temperature, the oil temperature, and the cooling water temperature, is defective. The battery management unit 400 may provide sensor defectiveness information to a driver through a vehicle control unit (not illustrated) when any one of the cell temperature sensor 130, the oil temperature sensor 140, and the cooling water temperature sensor 300 is determined to be defective.

Specifically, as shown in No. 2 of Table 2, when the result of determining the state of the battery cells 110 based on the oil temperature corresponds to the normal state and each of the results of determining the states of the battery cells 110 based on the cell temperature and the cooling water temperature corresponds to the over-temperature state, the battery management unit 400 may determine that the oil temperature sensor 140 for measuring the oil temperature is defective.

In addition, as shown in No. 4 of Table 2, when each of the results of determining the states of the battery cells 110 based on the oil temperature and the cooling water temperature corresponds to the normal state and the result of determining the state of the battery cells 110 based on the cell temperature corresponds to the over-temperature state, the battery management unit 400 may determine that the cell temperature sensor 130 for measuring the cell temperature is defective.

As shown in No. 6 of Table 2, when each of the results of determining the states of the battery cells 110 based on the oil temperature and the cell temperature corresponds to the normal state and the result of determining the state of the battery cells 110 based on the cooling water temperature corresponds to the over-temperature state, the battery management unit 400 may determine that the cooling water temperature sensor 300 for measuring the cooling water temperature is defective. As a result, the battery management unit 400 may detect the defectiveness of the cell temperature sensor 130 and the oil temperature sensor 140 by using the cell temperature, the oil temperature, and the cooling water temperature, thereby improving the reliability of the components.

The battery management unit 400 receives a level of the heat transfer oil 120 from the level sensor 150, measures a change in the level of the heat transfer oil 120 per predetermined unit time, and detects a leakage of at least one of the battery cells 110 and the heat transfer oil 120. The battery management unit 400 may provide leakage information to a driver through the vehicle control unit (not shown) when leakage of at least one of the battery cells 110 and the heat transfer oil 120 is detected.

Specifically, when the level of the heat transfer oil 120 becomes lower than that of a previous unit time, the battery management unit 400 may determine a leakage of the battery cells 110. The battery management unit 400 may determine a leakage of the heat transfer oil 120 when the level of the heat transfer oil 120 is lowered for a continuous unit time.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A battery pack comprising:
   a plurality of battery cells disposed in one direction;
   a heat transfer oil configured to contact surfaces of the battery cells;
   a frame configured to accommodate the battery cells and the heat transfer oil;
   a cooling plate configured to contact bottom surfaces of the battery cells through the frame and having cooling water flowing therein;
   a battery management unit configured to manage heat generated from the battery cells by using at least one of a cell temperature of the battery cells, a temperature of the heat transfer oil, and a temperature of the cooling water;
   a first temperature sensor configured to measure the cell temperature;
   a second temperature sensor configured to measure the temperature of the heat transfer oil; and
   a third temperature sensor configured to measure the temperature of the cooling water,
   wherein the battery management unit is configured to:
   determine a state of the battery cells by comparing the cell temperature of the battery cells, the temperature of the heat transfer oil, and the temperature of the cooling water,
   determine whether the battery cells are in a normal temperature state or an over-temperature state based on the cell temperature, the temperature of the heat transfer oil, and the temperature of the cooling water, and
   when one of the first to third temperature sensors measures a different temperature state for the battery cells from a temperature state for the battery cells measured by the other two of the first to third temperature sensors, and the temperature of the heat transfer oil measured by the second temperature sensor indicates that the battery cells are in the normal temperature state, determining whether one of the first to third temperature sensors is defective.

2. The battery pack of claim 1, wherein the battery management unit is configured to:
   control supply of the cooling water when it is determined that the battery cells are in the over-temperature state.

3. The battery pack of claim 2, wherein the battery management unit is configured to determine that the battery cells are in the over-temperature state when each of the cell temperature and the temperature of the heat transfer oil corresponds to the over-temperature state.

4. The battery pack of claim 2, wherein the battery management unit is configured to determine the state of the battery cells based on the temperature of the heat transfer oil when the state of the battery cells determined depending on the cell temperature is different from that depending on the temperature of the heat transfer oil.

5. The battery pack of claim 1, further comprising a level sensor configured to measure a level of the heat transfer oil.

6. The battery pack of claim 5, wherein the battery management unit is configured to determine a leakage of the battery cells or the heat transfer oil depending on a change in the level of the heat transfer oil.

7. The battery pack of claim 6, wherein the battery management unit is configured to determine that the battery cells have leaked when the level of the heat transfer oil becomes lower than that of a previous unit time, and determines that the heat transfer oil has leaked when the level of the heat transfer oil is continuously lowered.

8. The battery pack of claim 1, wherein the heat transfer oil contains an electrically insulating mineral oil.

* * * * *